United States Patent [19]

Sonderegger et al.

[11] Patent Number: 5,731,933
[45] Date of Patent: Mar. 24, 1998

[54] MOLDED ACTUATOR CRASH STOPS

[75] Inventors: Ralph L. Sonderegger, Farmington; Mark S. Thayne, West Point, both of Utah

[73] Assignee: Iomega Corporation, Roy, Utah

[21] Appl. No.: 783,408

[22] Filed: Jan. 16, 1997

Related U.S. Application Data

[63] Continuation of Ser. No. 547,867, Oct. 25, 1995, abandoned, which is a continuation-in-part of Ser. No. 324,599, Oct. 18, 1994, abandoned.

[51] Int. Cl.$^6$ ...................................................... G11B 5/55
[52] U.S. Cl. ................................................................ 360/106
[58] Field of Search ...................................... 360/105–106, 360/104; 369/244, 249, 215, 219, 220

[56] References Cited

U.S. PATENT DOCUMENTS

| | | |
|---|---|---|
| 4,393,425 | 7/1983 | Wright ........................... 360/105 |
| 4,939,611 | 7/1990 | Connolly ........................ 360/128 |
| 5,134,608 | 7/1992 | Strickler et al. ................ 369/215 |

FOREIGN PATENT DOCUMENTS

| | | | |
|---|---|---|---|
| 61-198480 | 9/1986 | Japan | 360/105 |
| 2-239480 | 9/1990 | Japan | 360/105 |

OTHER PUBLICATIONS

IBM Technical Disclosure Bulletin (vol. 20, No. 6, Nov. 1977, pp. 2362–2363).

*Primary Examiner*—Allen Cao
*Attorney, Agent, or Firm*—Woodcock Washburn Kurtz Mackiewicz & Norris LLP

[57] ABSTRACT

A magnetic disk drive has a linear actuator with crash stops molded in the retainer plate of the drive. The retainer plate holds various components in the drive. The crash stops include two leaves which have sufficient resiliency to absorb the impact energy of the carriage. The retainer plate has a recess at the base of the leaves which provides additional length to each leave to provide resilience, the components held by the container plate dissipate the impact energy of stopping.

8 Claims, 6 Drawing Sheets

MOLDED ACTUATOR CRASH STOPS

This is a continuation, of application Ser. No. 08/547,867, filed on Oct. 25, 1995, now abandoned, of Ralph Sonderegger entitled MOLDED ACTUATOR CRASH STOPS, which is a continuation-in-part of ACTUATOR FOR DATA STORAGE DEVICE, Ser. No. 08/324,599 filed Oct. 18, 1994, now abandoned, and is related to HEAD LOAD/UNLOAD AND CLEANING IN A DATA STORAGE DEVICE, Ser. No. 08/324,895 filed Oct. 18, 1994 and 'HEAD LOCKING AND CART EJECT LATCH COMBINATION', Ser. No. 08/234,808 filed Oct. 18, 1994.

BACKGROUND OF THE INVENTION:

This invention relates to a linear actuator for carrying read/write heads into engagement with a recording medium and, more particularly, to crash stops which are molded in the retainer plate of such an actuator.

Linear actuators have been used to carry magnetic heads into engagement with recording disks. Linear actuators have been used for magnetic disk drives, CD players and optical recording drives. These actuators typically use a voice coil motor to move the carriage of the actuator.

U.S. Pat. Nos. 4,939,611 Connolly and 5,134,608 Strickler et al. describe the use of crash stops in disk drives having either rotary or linear actuators.

Typical disk drive crash stops are made of foam which provides the necessary damping. These foam parts are typically stuck onto the drive in the right place. This requires additional steps in the assembly process as well as part costs and yield costs due to mistakes in assembly.

It is an object of the invention to simplify disk drive assembly and to provide more reliable crash stops.

SUMMARY OF THE INVENTION:

In accordance with the present invention, two leaves are molded into the retainer plate of a magnetic disk drive. These leaves are resilient to provide the appropriate shock resistance for stopping the carriage of the disk drive. When the carriage impacts the stops, impact energy is absorbed by the leaves and dissipated by the various friction components such as bearings, head wiper and heads.

The carriage rides on a central guide which is held in place by a post on the retainer plate. The crash stops are formed by leaves molded into the retainer plate adjoining this post.

By producing the crash stops as part of the molding process of the retainer plate, additional steps in the manufacturing process are avoided. Also, part costs and yield costs due to misassembly are avoided.

Further, in accordance with the invention, the spring rate of the molded crash stops is more constant, as opposed to an exponentially increasing rate produced by, for example, foam crash stops.

The foregoing and other objects, features and advantages of the invention will be better understood from the following, more detailed description and appended claims.

Figure 1:
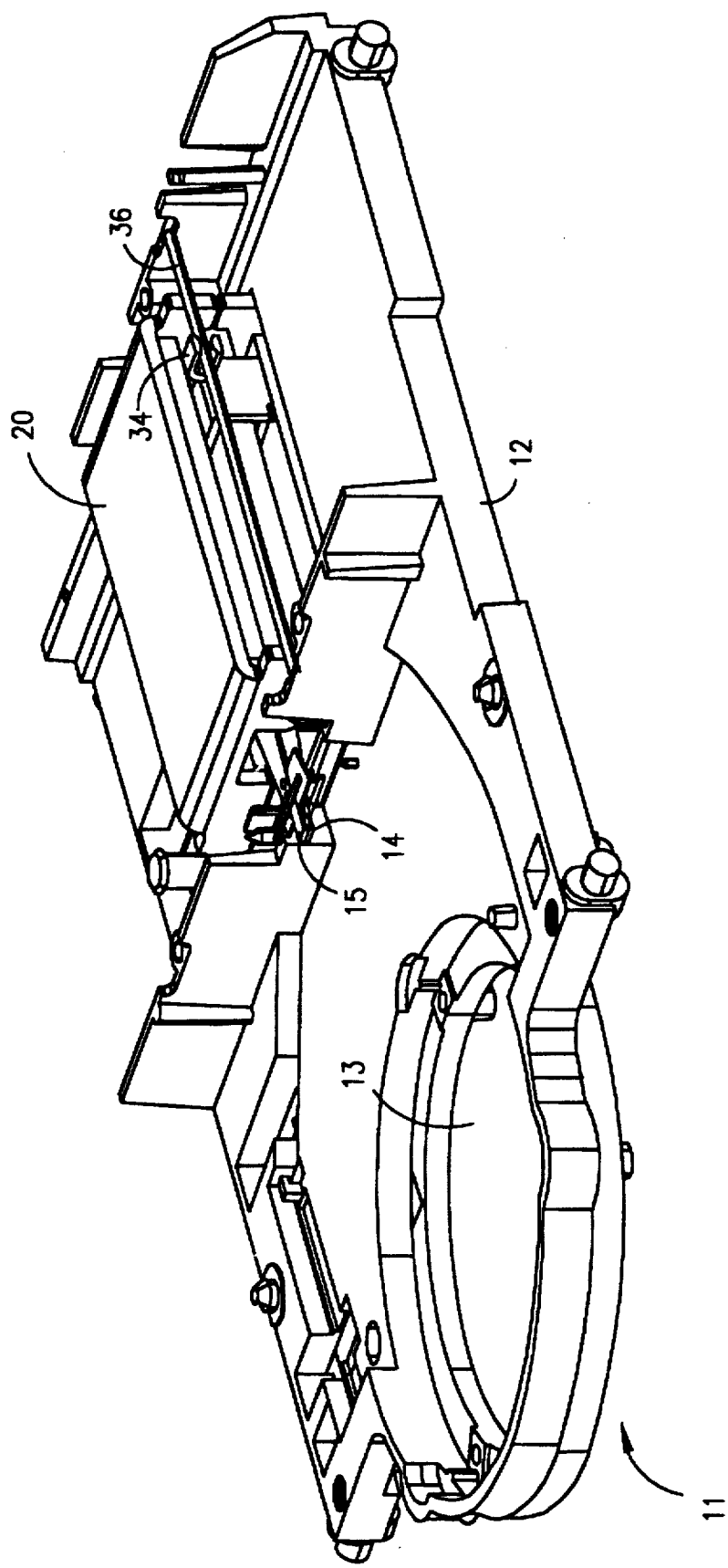
FIG. 1 shows the disk drive of the present invention with the cover removed.

DESCRIPTION OF THE PREFERRED EMBODIMENT:

FIG. 1 shows a disk drive for reading and writing data on a recording disk in a cartridge. The cartridge is inserted into the drive at 11. A motor which is mounted on the platform 12 at 13 rotates the flexible disk in the cartridge.

Figure 2:
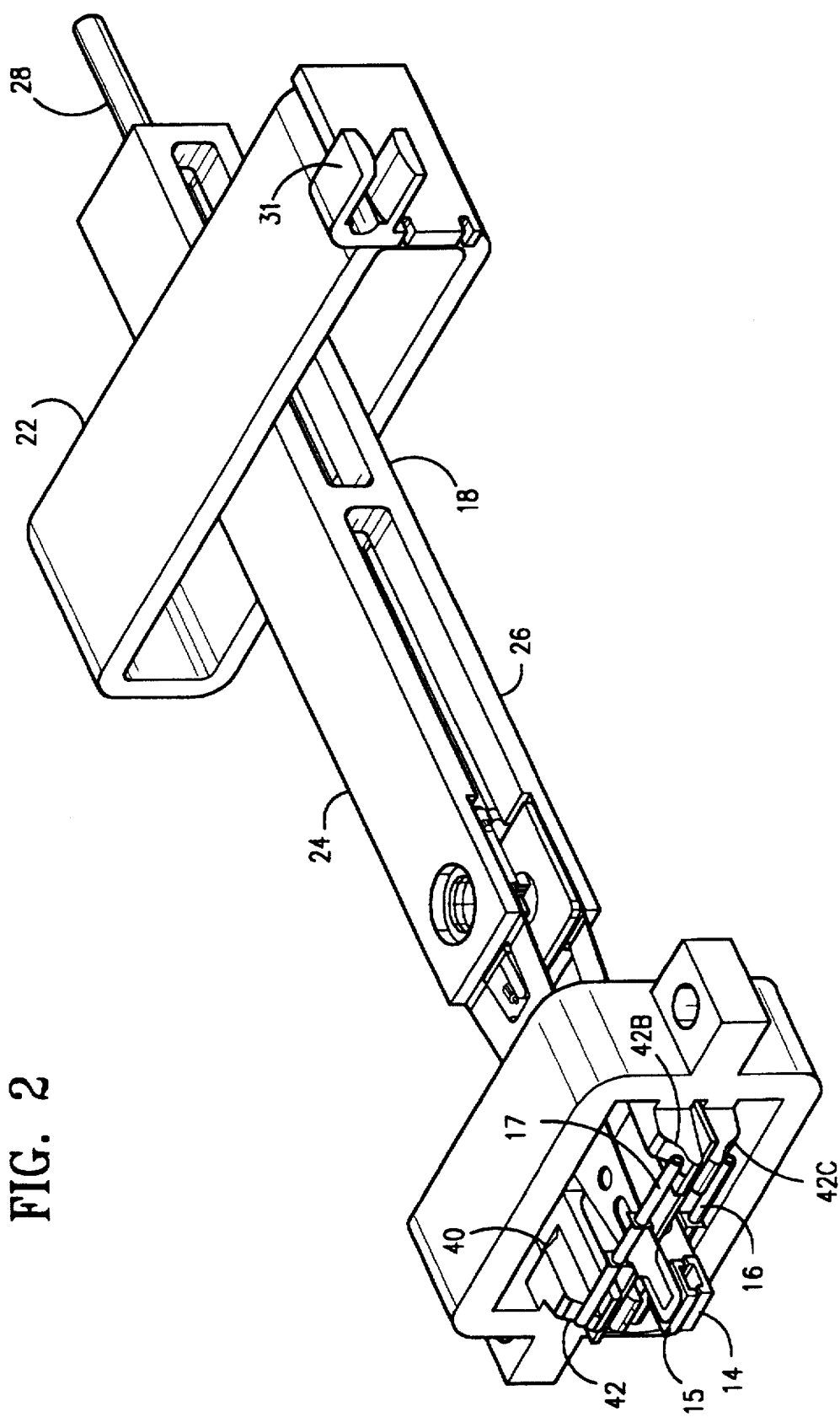
FIG. 2 shows the actuator of the present invention.

The disk is engaged by read/write heads 14 and 15 which are carried by the actuator of the present invention. Opposed heads 14 and 15 engage both sides of the disk. The heads 14 and 15 are mounted on standard Winchester hard disk drive suspensions which have been modified to include the lifting rods 16 and 17 (FIG. 2).

Figure 3:
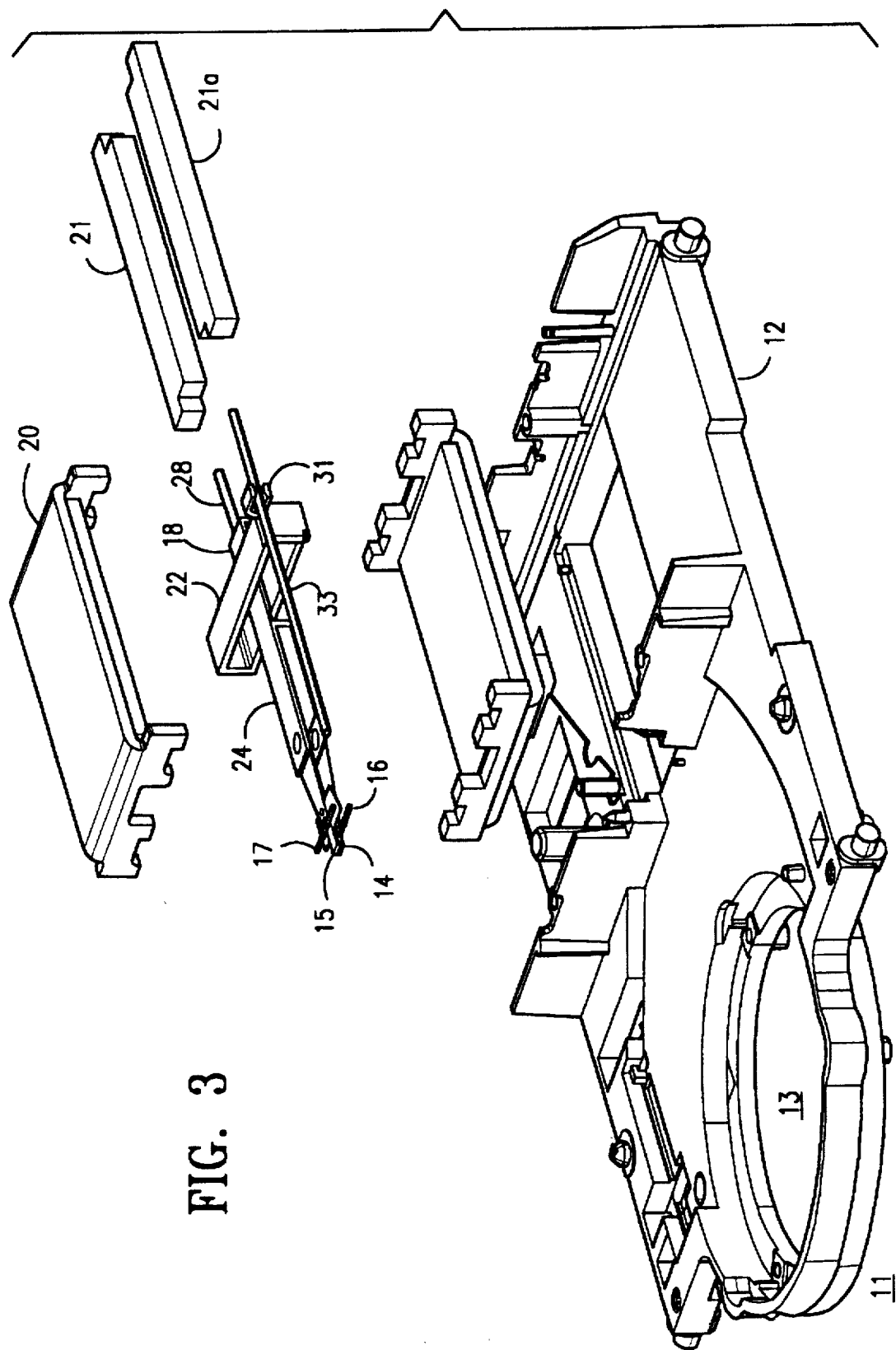
FIG. 3 is an exploded view of the actuator.
Figure 4:
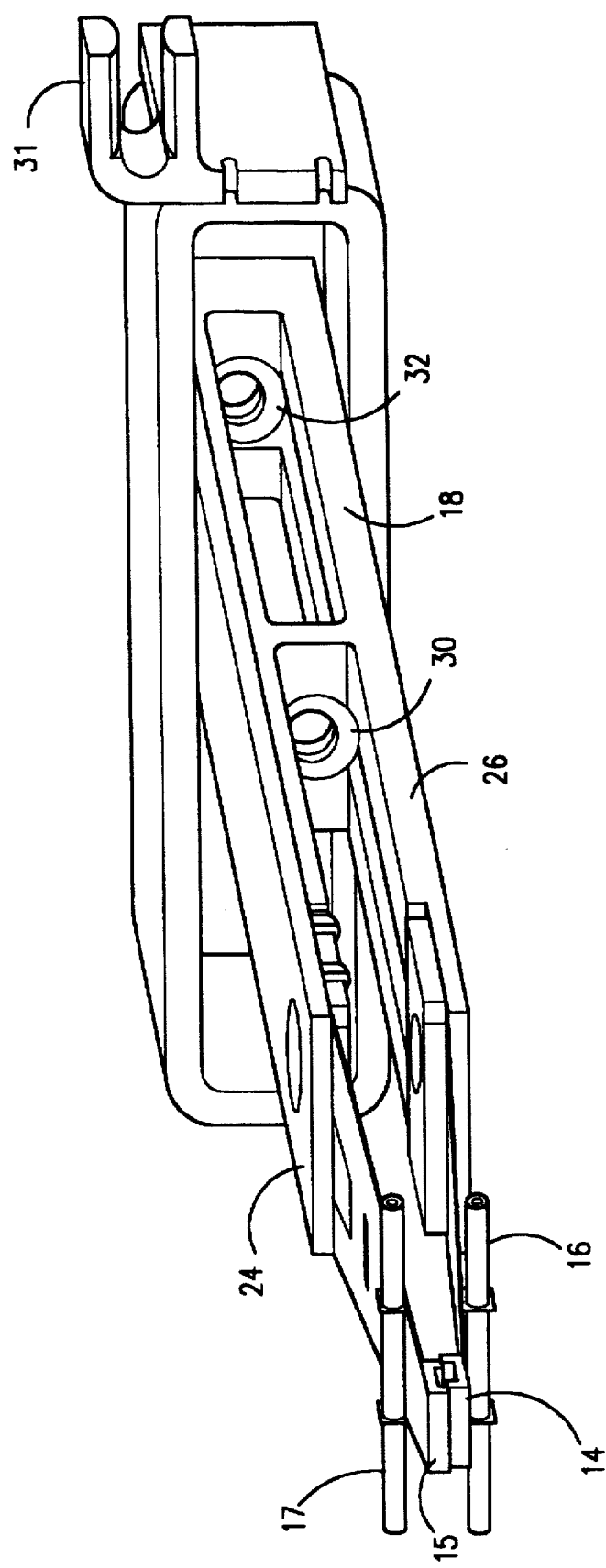
FIG. 4 is a close-up view of the actuator.

The voice coil motor for driving the carriage 18 into and out of engagement of the heads with the recording medium includes an outer return path 20 (FIG. 1), and inner return path members 21 and 21a (FIG. 3). A voice coil 22 (FIGS. 2 and 3) is mounted on the carriage assembly. The coil is bonded to the carriage assembly. When the coil 22 is energized, it interacts with the magnets to move the carriage 18 linearly so that the heads 14 and 15 engage concentric tracks on disk. The carriage includes two lightweight arms 24 and 26 (FIG. 4). The carriage travels on a central guide track 28 which is a cylindrical member, a small wire guide in the preferred embodiment.

The carriage has cylindrical bushings 30 and 32 through which the cylindrical guide track 28 passes. The guide track 28 aligns the heads 14 and 15 with the disk and the motor. Bushings 30 and 32 are sapphire jewel bearings in the preferred embodiment. An outrigger guide 31 travels along outrigger track 33 to stabilize the carriage as it travels the central guide track 28.

A flex circuit 34 (FIG. 6) provides an electrical connection between the heads 14 and 15 and the circuitry for the disk drive. A solenoid 36 actuates platform latch 38 so the carriage cannot be moved when there is no cartridge in the disk drive. Platform latch 38 latches the carriage. Load ramps 40 and 42 load the heads onto the disk when the carriage is actuated for engagement of the heads with the disk.

A retainer plate 44 holds in place the return members 20, 21 and 21a, the flex circuit 34, the solenoid 36 (which fits in the indentation 36a in the retainer plate), the platform latch 38 and the load ramps 40 and 42.

A post 45 extends from the retainer plate to hold down the end of the cylindrical guide track 28.

Figure 5:
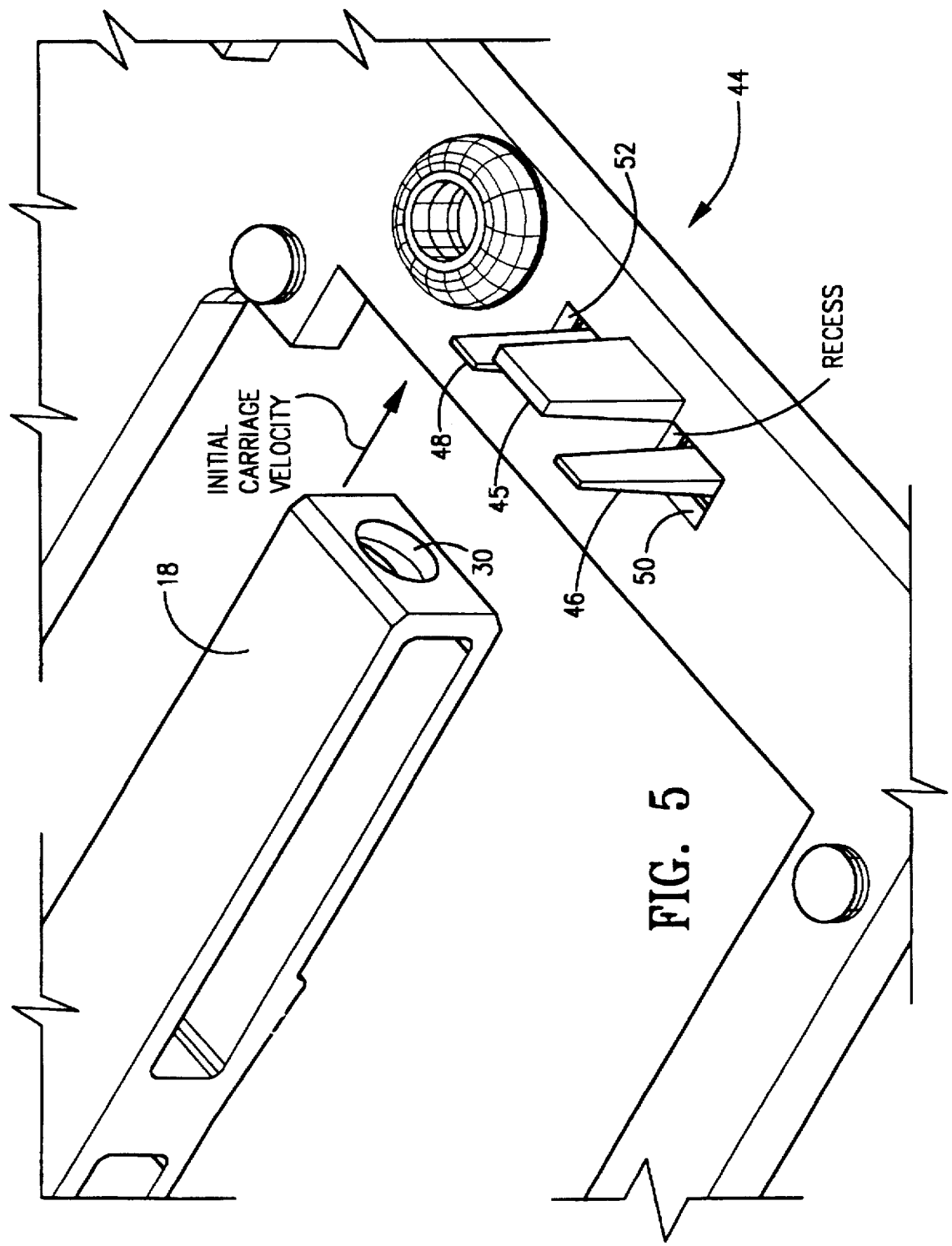
FIG. 5 is a close-up view of the crash stops of the invention.
Figure 6:
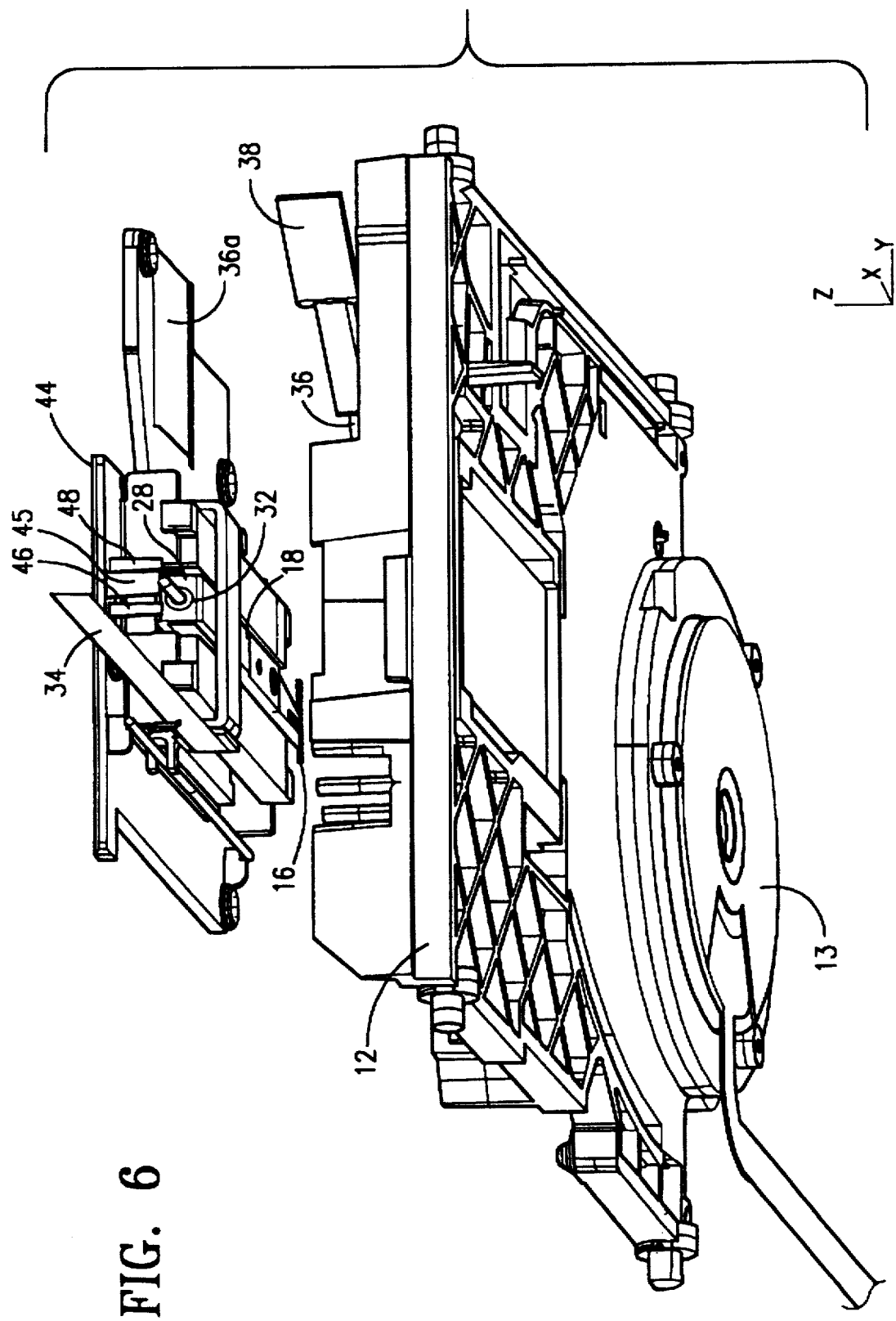
FIG. 6 is a perspective view of the bottom of the drive.

In accordance with the present invention, the leaves 46 and 48 are molded into the retainer plate 44 (FIGS. 5 and 6). The leaves 46 and 48 are set in recesses 50 and 52 in the retainer plate 44. The recesses 50 and 52 give added length to the leaves 46 and 48, whereas the available space would otherwise limit the length. This gives the leaves 46 and 48 the desired resiliency for shock absorption in the space which is available. As the carriage 18 moves linearly to the end of its travel path, it impacts the leaves 46 and 48. The impact energy is absorbed by the leaves and dissipated by the various components which are held in place by the retainer plate 44.

While a particular embodiment of the invention has been shown and described, various modifications may be made. All such modifications within the true spirit and scope of the invention are covered by the appended claims.

What is claimed is:

1. A magnetic disk drive comprising:

a central guide track:

read/write heads for engagement with a recording medium;

a carriage assembly for linearly moving along the central guide track, said heads being mounted on said carriage assembly;

a magnetic motor including a coil mounted on said carriage assembly for driving said carriage assembly linearly such that said heads move into and out of engagement with said medium;

a retainer plate holding components of said disk drive, said retainer plate having recesses;

flexible leaves, each of said leaves having a free end and a fixed end; wherein the fixed end is molded into one of said recesses; said leaves stopping the end of travel of said carriage assembly, said leaves having a length which gives them resilience for absorption of the impact energy of said stopping so that said energy is dissipated by said components; and wherein each of said recesses allow for an additional length to each of said leaves to provide the resilience required for absorbing said impact energy.

2. The magnetic disk drive recited in claim 1 further comprising:

said retainer plate having a post for stopping an end of said central guide track.

3. The magnetic disk drive recited in claim 2 having two leaves, one on either side of said post, said leaves extending from said retainer plate.

4. The disk drive recited in claim 1 wherein said magnetic motor includes return path members and wherein said retainer plate holds said return path members.

5. The magnetic disk drive recited in claim 1 wherein said components include:

a flex circuit providing electrical connections for said read/write head, said retainer plate holding said flex circuit.

6. The magnetic disk drive recited in claim 1 wherein said components include:

load ramps for said magnetic heads, said load ramps loading said heads onto said recording member, said load ramps being held by said retainer plate.

7. The magnetic disk drive recited in claim 1 wherein said components include:

a platform latch for latching said carriage assembly, said retainer plate holding said platform latch.

8. The magnetic disk drive recited in claim 7 wherein said components include:

a solenoid for actuating said platform latch, said retainer plate holding said solenoid.

* * * * *